(12) United States Patent
Pámpanas et al.

(10) Patent No.: US 8,536,263 B2
(45) Date of Patent: Sep. 17, 2013

(54) POLYURETHANE-ACRYLIC POLYMER DISPERSIONS AND USES THEREOF

(75) Inventors: Pilar Pámpanas, Madrid (ES); Carsten Zilg, Korntal-Münchingen (DE); Carlos Molina, Madrid (ES); Manuel Rodriguez, Madrid (ES); Luz Granizo Fernández, Madrid (ES)

(73) Assignee: Sika Technology AG, Baar (CH)

( * ) Notice: Subject to any disclaimer, the term of this patent is extended or adjusted under 35 U.S.C. 154(b) by 0 days.

(21) Appl. No.: 13/341,030

(22) Filed: Dec. 30, 2011

(65) Prior Publication Data

US 2012/0160414 A1 Jun. 28, 2012

Related U.S. Application Data

(63) Continuation of application No. PCT/EP2010/059417, filed on Jul. 2, 2010.

(30) Foreign Application Priority Data

Jul. 2, 2009 (EP) ..................................... 09382106

(51) Int. Cl.
*C09D 5/02* (2006.01)

(52) U.S. Cl.
USPC ........................................................ 524/501

(58) Field of Classification Search
USPC ........................................................ 524/501
See application file for complete search history.

(56) References Cited

U.S. PATENT DOCUMENTS

| | | | |
|---|---|---|---|
| 4,331,726 A | 5/1982 | Cleary | |
| 6,174,960 B1 * | 1/2001 | Phan et al. | 525/191 |
| 2001/0007711 A1 | 7/2001 | Schwartz et al. | |
| 2005/0124736 A1 | 6/2005 | Bonnet et al. | |
| 2009/0130454 A1 * | 5/2009 | Ogino et al. | 428/423.1 |

FOREIGN PATENT DOCUMENTS

| | | | |
|---|---|---|---|
| CN | 101153180 | * | 4/2008 |
| CN | 101153180 A | | 4/2008 |
| JP | 57-35342 B2 | | 7/1982 |
| WO | WO 96/00259 | | 1/1996 |

OTHER PUBLICATIONS

XP-002554977.
XP-002554978.
International Search Report (PCT/ISA/210) issued on Nov. 23, 2010, by European Patent Office as the International Searching Authority for International Application No. PCT/EP2010/059417.
Written Opinion (PCT/ISA/237) issued on Nov. 23, 2010, by European Patent Office as the International Searching Authority for International Application No. PCT/EP2010/059417.

* cited by examiner

*Primary Examiner* — Ling Choi
*Assistant Examiner* — Lanee Reuther
(74) *Attorney, Agent, or Firm* — Buchanan Ingersoll & Rooney PC

(57) ABSTRACT

Compositions for coating roofs, facades, floors or vertical facings including at least one acrylic polymer and at least one polyurethane polymer and at least one ethylene vinyl acetate emulsion. The compositions combine the advantages of the excellent features of polyurethane compositions with the reduced cost of acrylic compositions in such a manner that a balance between both characteristics is shown. Methods for covering a roof, facade, floor or vertical facing with these compositions and the use thereof as a coating for roofs, facades, floors or vertical facings.

19 Claims, No Drawings

POLYURETHANE-ACRYLIC POLYMER DISPERSIONS AND USES THEREOF

RELATED APPLICATION(S)

This application claims priority as a continuation application under 35 U.S.C. §120 to PCT/EP2010/059417, which was filed as an International Application on Jul. 2, 2010 designating the U.S., and which claims priority to European Application No. 09382106.4 filed in Europe on Jul. 2, 2009. The entire contents of these applications are hereby incorporated by reference in their entireties.

FIELD

The present disclosure relates to compositions combining an acrylic component with another polyurethane component, and uses thereof, for example, as liquid membranes for roofs.

BACKGROUND INFORMATION

Aqueous acrylic and polyurethane dispersions have been widely used in coating applications, both independently and in physical mixtures. By combining both components, the resulting coating can show a balance of properties from the individual inherent characteristics of acrylic and polyurethane products, and the mixture can benefit from the better features of polyurethane and from the reduced cost of acrylic. This can be interesting in the case of outdoor coatings such as coatings for roofs.

However, the properties of these mixtures often do not achieve the aforementioned properties from the traditional "rule of mixtures". Though the reasons for these unwanted effects in physical mixtures have not yet been well defined, the non-homogeneity caused by the different acrylic and polyurethane domains can contribute to these effects. These areas can have excessive internal stress and/or incomplete coalescence, which can cause an increased permeability and reduced bond strength.

For example, U.S. Patent Application Publication No. 2001/0007711 A1 describes a method for coating concrete molds comprising the application of at least one plastic mineral composition which can bond to cement, comprising at least one aqueous polymer dispersion containing a percentage not exceeding 2% by weight of copolymerized monoethylenically unsaturated monomers.

International Publication No. WO 96/00259 describes a method for producing a thermosetting elastomeric matrix, comprising vulcanizing an elastomeric material and a thermoplastic polymer material having a predetermined softening/melting temperature, producing a dispersion of the thermoplastic polymer material through the vulcanizable elastomeric material, and finally curing the thermoplastic-containing matrix.

U.S. Patent Application Publication No. 2005/0124736 A1 describes aqueous polymer compositions containing at least one aqueous bitumen dispersion and at least one aqueous dispersion of at least one polyurethane. This composition is used in surface dressings and as watertight roof coatings.

U.S. Pat. No. 4,331,726 describes pourable roofing compositions comprising discrete small chunks or pieces of closed cell plastics material, such as polyurethane, an inert particulate material, and an emulsion caulking or sealing type binder or adhesive based on acetates, acrylic resins, epoxy adhesives, and the like.

SUMMARY

According to an exemplary aspect, an aqueous composition suitable for coating roofs, facades, floors or vertical facings is disclosed, comprising: i) at least one acrylic polymer, ii) at least one polyurethane polymer, and iii) at least one ethylene vinyl acetate emulsion in an amount of between 5 and 40% by weight of the total weight of the composition.

According to another exemplary aspect, a roof, facade, floor or vertical facing is disclosed, comprising an aqueous composition, wherein the aqueous composition comprises: i) at least one acrylic polymer, ii) at least one polyurethane polymer, and iii) at least one ethylene vinyl acetate emulsion in an amount of between 5 and 40% by weight of the total weight of the composition.

According to another exemplary aspect, a method for covering a roof, facade, floor or vertical facing with a composition is disclosed, the method comprising: a) stirring the composition by mechanical stirring until achieving complete homogeneity thereof; and b) applying the composition resulting from step a) on a roof, facade, floor or vertical facing with a roller, brush, trowel or by spraying.

According to another exemplary aspect, a method of applying a composition to a substrate is disclosed, the method comprising: a) stirring the composition according to claim 1; and b) applying the composition resulting from the step a) on a substrate.

DETAILED DESCRIPTION

According to an exemplary aspect, provided is a composition which can be used as a liquid membrane for coating roofs, which is able to combine the advantages of the excellent features of polyurethane compositions with the reduced cost of acrylic compositions, showing a balance between both characteristics, for coating roofs and facades.

In accordance with exemplary aspects, provided are aqueous compositions for coatings, for example, for outdoor coatings, such as coatings for roofs, showing a balance between the advantages of the better features of polyurethane and the reduced cost of acrylic.

For example, it is possible to achieve a polyurethane-acrylic composition by means of the combination of
i) at least one polyurethane polymer and
ii) at least one acrylic component and
iii) at least one ethylene vinyl acetate emulsion.

The amount of the at least one ethylene vinyl acetate emulsion can be between 5 and 40% by weight of the total weight of the composition.

In an exemplary embodiment, the ethylene vinyl acetate emulsion balances the first two components ((i) and (ii)), and with it the advantageous characteristics of both. In such composition, the acrylic monomers and the urethane prepolymers are intimately mixed and mutually polymerized in aqueous dispersion, resulting in "hybrid" polyurethane-acrylic polymer dispersions. In the compositions of the disclosure, as is believed, the result is an interpenetrating polymer network showing unique properties compared with standard acrylic dispersions, polyurethane dispersions, or acrylic/urethane dispersions in macroscopic mixture. Without wishing to be bound by theory, for example, the inventors believe that these properties seem to be directly attributable to the hybrid acrylic-polyurethane morphology. As is believed, these hybrid compositions are not the result of a copolymerization process, in which the acrylic and urethane segments are bound directly through primary bonds, nor are they mixtures with large acrylic and polyurethane domains. In contrast, the compositions of the disclosure seem to be acrylic and polyurethane chains which are intimately mixed at the molecular level and presumably remain bound through secondary intermolecular bonding forces which lead to a web of bound chains. Some of the additional advantages of the compositions of the disclosure are their increased tensile strength, hardness, durability and resistance to chemical products and solvents, as well as the advantage that they are compositions which can be easily applied since they can be one component (single pack) systems, odorless and organic solvent-free, they have a high chemical and mechanical strength, suitable performance in terms of aging in extreme temperatures, and a satisfactory feature/cost ratio.

In the present specification, "acrylic component" is understood as any acrylic acid derivative, for example, non-styrenic, although it could also be styrenic. "Acrylate" is understood as any acrylic acid derivative, polyacrylates, methacrylic acid or polymethacrylates. Examples of acrylic components are, for example, Acronal® 567, Revacryl® 473.

Also, in the present specification, "polyurethane component" is understood as any polymer composition consisting of chains of organic units bound by urethane bonds, and which can be obtained by means of the condensation of polyols or polyesters with polyisocyanates. For example, the polyurethane component does not have any free isocyanate groups left. Examples of polyurethane components are Esacote 21 or Prox R 910.

The acrylic and polyurethane components can be supplied to the compositions of the disclosure either as separate, individual components or as a single combined acrylic-polyurethane composition ("combined product").

In the present specification, "ethylene vinyl acetate emulsion" is understood as any aqueous composition resulting from the copolymerization of vinyl acetate and ethylene. This copolymerization can be carried out in the presence of a poly(vinyl alcohol) stabilizing system. The copolymer formed is hence referred to in the present text as "ethylene vinyl acetate".

Exemplary embodiments of the present disclosure are described below only as examples.

In an exemplary embodiment, the acrylic and polyurethane components are provided in the form of a combined, single product, which is a product based on a pure acrylic polymer, i.e., non-styrenic, thermoplastic, in an external surfactant aqueous emulsion, which has been modified with an aliphatic polyurethane polymer in aqueous dispersion/solution. This combined product can contain different proportions of the acrylic and polyurethane components, namely: in the exemplary embodiments the concentration of the polyurethane component is from 5 to 85% by weight of the total weight of the combined product, for example, from 7 to 75%, for example, from 10 to 50%, for example, from 10 to 30% by weight of the total weight of the combined product.

This combined acrylic-polyurethane product is supplied to the final compositions of the disclosure at an exemplary concentration between 10 and 50% by weight of combined product of the total weight of the final composition; for example, between 20 and 50% by weight, for example, between 30 and 40%, for example, between 35 and 40%, for example, about 37% of the total weight of the final composition.

The combined acrylic-polyurethane product can have a solid content of between 30 and 70% by weight, for example, between 40 and 50% by weight, in view of the weight of the combined acrylic-polyurethane product. It can be an emulsion or dispersion.

To obtain the final compositions, an ethylene vinyl acetate emulsion is added to this combined product in an exemplary proportion between 5 and 40% by weight of the total weight of the final composition, for example, between 10 and 35%, for example, between 15 and 30%, for example, between 17 and 25%, for example, about 20% by weight of the total weight of the composition.

The ethylene vinyl acetate emulsion can have a solid content of between 30 and 70% by weight, for example, between 40 and 50% by weight, in view of the weight of the ethylene vinyl acetate emulsion.

The rest of the composition up to 100% can be optionally completed with one or more of the following additives: rheological additives, preservatives, bactericidal agents, de-airing agents, water repellant agents, filler wetting agents, fillers and pigments.

In an exemplary embodiment, in the absence of fillers which form silicate sheets (phyllosilicates) or chains (inosilicate) such as Mica, Muscovite, Wollastonite or Sericite, an excellent hydrothermal and UV stability of the coating can be observed. In an exemplary embodiment, in the absence of phosphates, excellent adhesion properties, for example, on concrete, can be obtained. An exemplary filler is calcium carbonate, for example, ground calcium carbonate. This can allow the formulation of coatings which are cheap and nevertheless show high performance.

To produce exemplary compositions, the indicated starting materials are added step-wise and are mixed in a suitable mixer, obtaining a one component (single pack) product which once applied forms a continuous and seamless membrane with a series of properties making it suitable for waterproofing newly constructed roofs or for restoration.

Exemplary benefits include, for example, high resistance to UV radiation, without yellowing; it maintains its properties in severe conditions (hot and cold); high elasticity, able to bridge cracks; one component system (single pack); it does not contain organic solvents; once cured, it forms a completely continuous seamless membrane; permeable to water vapor.

It has good adherence on a wide range of substrates after suitable treatment thereof including, for example, metal, concrete, wood and ceramic supports. In the case of concrete, the latter can have sufficient compressive strength and adherence greater than 0.8 N/mm$^2$ (according to EN 1504-2).

| Substrate | Adherence (kg/cm$^2$) | Comment |
|---|---|---|
| Cement | 27.53 | Cohesive failure of concrete |
| Metal | 24.3 | Cohesive failure of concrete |
| Tile | 15.6 | Cohesive failure of concrete |
| Natural wood | 20.9 | Cohesive failure of concrete |
| Particle board | 6.7 | Cohesive failure of concrete |
| Fiber cement | 9.14 | Cohesive failure of concrete |

Adherence has been tested according to standard EN 1542 (determination of adhesion by direct traction).

The compositions of the disclosure can be applied with ambient temperatures, for example, between 8 and 35° C. and maximum ambient humidity of 80% and on concretes with humidity less than 8%. They can be applied by means of a roller, brush, and trowel or by spraying. They can be applied in two phases, for example, applying the second layer once the first one is dry; the first layer will in turn have a primer function. If considered necessary according to the characteristics of the work, the system can be reinforced in its entirety or simply in individual points by incorporating a polyester mesh (such as Silva Fleece 120). The thicknesses of the final system can range between 0.5-2.5 mm depending on the requirements of the roof.

The drying times can depend on the temperature, and exemplary drying times are as follows:

| Temperature | Drying time for repainting |
| --- | --- |
| +10° C. | 7 hours |
| +20° C. | 6 hours |
| +30° C. | 4 hours |
| +40° C. | 3 hours |

| Temperature | Time after which it is resistant to rain |
| --- | --- |
| +10° C. | 5 hours |
| +20° C. | 3 hours |
| +30° C. | 3 hours |
| +40° C. | 2 hours |

| Temperature | Time after which it is resistant to pedestrian traffic |
| --- | --- |
| +10° C. | 24 hours |
| +20° C. | 16 hours |
| +30° C. | 16 hours |
| +40° C. | 8 hours |

An exemplary aspect is a method for covering a roof, facade, floor or vertical facing with the composition disclosed above comprising the following steps:
a) stirring the composition by means of mechanical stirring until achieving complete homogeneity thereof;
b) applying the composition resulting from the previous step a) on the roof, facade, floor or vertical facing by means of a roller, brush, trowel or by spraying.

In an exemplary embodiment of the disclosure said method furthermore comprises step c):
c) applying the composition resulting from the previous step a) on dry layer obtained by step b) by means of a roller, brush, trowel or by spraying.

The above disclosed aqueous composition can be used as a coating for roofs, facades, floors or vertical facings.

An exemplary aspect is a roof, facade, floor or vertical facing comprising the composition which is disclosed above.

EXAMPLES

Various compositions were subjected to testing: an exemplary composition, designated as "AC-PU/VAE" and the compositions based on each polymer added independently, "AC-PU" and "VAE". These compositions were produced from the following components and by means of the process described below:

TABLE 1

Description of the AC-PU/VAE, AC-PU and VAE compositions

|  | AC-PU/VAE | AC-PU | VAE |
| --- | --- | --- | --- |
| AC-PU1[1] [% by weight] | 37.00 | 57.00 |  |
| VAE1[2] [% by weight] | 20.00 |  | 57.00 |
| Thickener based on acrylic polymers [% by weight] | 0.90 | 0.90 | 0.90 |
| Anti-foaming additive [% by weight] | 0.25 | 0.25 | 0.25 |
| Preservative [% by weight] | 0.15 | 0.15 | 0.15 |
| Dispersant and filler wetting agent and pigments [% by weight] | 0.40 | 0.40 | 0.40 |
| Pigment paste | 11.00 | 11.00 | 11.00 |
| Adherence enhancer [% by weight] | 0.10 | 0.10 | 0.10 |
| Calcium carbonate [% by weight] | 28.70 | 28.70 | 28.70 |
| Coalescent additive [% by weight] | 1.50 | 1.50 | 1.50 |

[1]Acrylic/Aliphatic polyurethane polymer in aqueous emulsion, with a pH between 8-9, with a mean particle size less than 400 nanometers, solid content between 40 and 50%, density between 1.0-1.1 kg/l, Brookfield viscosity at 25° C. between 5-500 cps, emulsified by means of anionic surfactants and stabilized by tensides. Its minimum film-forming temperature is between −10 and 10° C.
[2]Aqueous dispersion based on ethylene/vinylacetate, with a pH between 4-5, with a mean particle size less than 0.6 micrometers, with solid content between 40-60%, with Brookfield viscosity at 25° C. between 5-600 cps, stabilized by tensides. Its minimum film-forming temperature is between −10 and 10° C.

For their respective preparations, the ingredients listed in Table 1 were added and were intensely mixed with a dissolver until achieving a homogenous mixture with a particle size less than 60 microns.

Once the manufacturing process has ended in the case of the AC-PU/VAE product, a product with the following characteristics was obtained:
Density at 23° C. between 1.33-1.37 kg/l
Solid content between 64.5 and 66.5%, tested by subjecting the liquid product to a temperature of 105° C. until reaching constant weight.
Viscosity between 4000 and 5000 mPas measured with a Rheomat viscometer (Contraves) at a temperature of 20° C., at a rate of 415 rpm and with screw N. 3

Once the manufacturing process has ended in the case of the AC-PU product, a product with the following characteristics was obtained:
Characteristics: Density (23° C.): 1.31 kg/l
Solid content by weight: 64.0%
Viscosity (23° C.): 3070 mPas (415 rpm/S3) (Contraves)
Application: Homogenize the product by means of stirring, apply with short bristle roller in two layers with 1.0 kg/m² per layer.

Once the manufacturing process has ended in the case of the VAE product, a product with the following characteristics was obtained:
Density (23° C.): 1.31 kg/l
Solid content by weight: 62.3%
Viscosity (23° C.): 2926 mPas (415 rpm/S3) (Contraves)
Application: Homogenize the product by means of stirring, apply with short bristle roller in two layers with 1.0 kg/m² per layer.

These compositions were subjected to various tests, comparing them with commercial products for continuous waterproofing of roofs:
SKL 445: Trade name: SikaLastic® 445
  Manufacturer: Sika, S.A.U.
  Description: Roof waterproofing agent based on one component (single pack) polyurethane. Contains organic solvents.
  Characteristics: Density (23° C.): 1.6 kg/l
  Solid content by weight: 88%
  Application: Homogenize by means of stirring the product, apply by means of short bristle roller in two layers with 1.6 kg/m2 per layer.
SKL 822: Trade name: SikaLastic® 822
  Manufacturer: Sika, S.A.U.
  Description: Roof waterproofing agent based on two component polyurethane.

Characteristics: Density component A (23° C.): 1.69 kg/l
Density component B (23° C.): 1.03 kg/l
Density of the mixture (23° C.): 1.33 kg/l
Solid content by weight: >96%
Application: Mix the components A and B to complete homogeneity, apply by means of notched trowel, with a consumption of 2.6 kg/m²

DRYFLEX: Trade name: Dryflex P.U.M.P.
Manufacturer: RLA Tile Adhesives
Description: Roof waterproofing agent based on water-based modified polyurethane.
Characteristics: Density (23° C.): 1.25 kg/l
Solid content by weight: 63%
Application: Homogenize the product by means of stirring, apply with short bristle roller in two layers with 1.5 l/m² per layer.

SIKAFILL: Trade name: Sikafill
Manufacturer: Sika, S.A.U.
Description. Roof waterproofing agent based on styrene-acrylic copolymers in aqueous emulsion.
Characteristics: Density (23° C.): 1.20 kg/l
Solid content by weight: 60%
Application: Homogenize the product by means of stirring, apply with short bristle roller in two layers with 1.0 kg/m² per layer.

UV-CRS: Product formulated using acrylic resin as a base having a built-in UV crosslinking system
Internal experimental formula not based on polyurethane or vinylacetate/ethylene emulsion.
Characteristics: Density (23° C.): 1.28 kg/l
Solid content by weight: 62.6%
Viscosity (23° C.): 5300 mPas (200 rpm/S4)(Contraves)
Application: Homogenize the product by means of stirring, apply with short bristle roller in two layers with 1.0 kg/m² per layer.

The testing program was performed with all the products described above for the purpose of checking and assessing exemplary parameters for a product the function of which will be to waterproof roofs. These tests were:
1. water absorption;
2. liquid water permeability (UNE-EN 1063-3:2008);
3. variation of the color after exposure to solar radiation;
4. variation of mechanical properties after accelerated aging; and
5. adherence to wet and dry concrete.

The Obtained Results Were:
1. Water Absorption Test
Specimens of all the products measuring 3 cm in diameter and 1 mm thick were prepared to conduct this test. After 20 days, a period in which they all reached constant weight, they were immersed in deionized water at ambient temperature for 42 days, periodically extracting samples to weigh them after drying with absorbent paper.

After 42 days, the immersion stops and the samples are left to dry at 23° C. and 50% humidity for a period of 14 days. After this time, they are weighed again and a second cycle commences with the same previous process.

Results:

| | 1st Cycle/Weight gained (%) | | | | | | | |
|---|---|---|---|---|---|---|---|---|
| Days | SKL 445 | SKL 822 | DRY-FLEX | SIKA-FILL | UV-CRS | AC-PU | VAE | AC-PU/VAE |
| 1 | 1.52 | 2.14 | 14.67 | 12.85 | 16.29 | 10.30 | 15.58 | 9.75 |
| 5 | 2.44 | 3.95 | 28.63 | 24.19 | 26.41 | 12.26 | 15.67 | 7.09 |
| 7 | 2.53 | 4.12 | 32.50 | 26.41 | 28.19 | 12.71 | 15.27 | 6.51 |
| 14 | 2.45 | 5.09 | 41.35 | 30.00 | 29.80 | 11.19 | 13.26 | 6.13 |
| 28 | 2.93 | 5.98 | 51.40 | 33.00 | 29.76 | 10.45 | 12.07 | 4.71 |
| 35 | 3.13 | 6.32 | 56.29 | 34.33 | 29.96 | 10.66 | 13.29 | 5.06 |
| 42 | 3.07 | 6.71 | 58.69 | 35.16 | 29.39 | 10.49 | 13.45 | 4.79 |

| | 2nd Cycle/Weight gained (%) | | | | | | | |
|---|---|---|---|---|---|---|---|---|
| Days | SKL 445 | SKL 822 | DRY-FLEX | SIKA-FILL | UV-CRS | AC-PU | VAE | AC-PU/VAE |
| 1 | 1.45 | 2.51 | 2.93 | 3.63 | 7.18 | 2.45 | 4.36 | 4.23 |
| 5 | 1.90 | 3.86 | 7.18 | 7.17 | 8.75 | 5.38 | 6.34 | 5.40 |
| 7 | 2.38 | 5.11 | 10.73 | 10.05 | 10.12 | 8.05 | 8.40 | 5.03 |
| 14 | 2.69 | 6.26 | 15.19 | 13.80 | 10.58 | 11.84 | 8.92 | 5.40 |
| 28 | 3.01 | 7.22 | 20.90 | 17.67 | 9.17 | 14.56 | 8.68 | 5.33 |
| 35 | 3.18 | 8.01 | 23.13 | 19.14 | 9.76 | 16.06 | 9.01 | 5.36 |
| 42 | 3.12 | 7.93 | 24.78 | 20.02 | 8.75 | 16.75 | 8.79 | 5.32 |

2. Liquid Water Permeability Test

The test was conducted following the process described in standard UNE-EN 10633:2008. Concrete specimens with a liquid water transmission rate, w, exceeding 5 kg/(m²h$^{0.5}$) and density comprised between 1500-20005 kg/m³, with a surface area of 200 cm² and minimum thickness of 2.5 cm are prepared. The specimens are left to dry and coated with the products to be tested, applying the amount of product per square meter established in the corresponding technical product data sheets of the product.

The coating is left to dry for at least 7 days and the back and the edges of the specimen that will be in contact with the water are sealed, overlapping the test surface by at least 5 mm, but not more than 10 mm. The product used for sealing can be any water-repellant product, for example Sikaflex 11FC. The specimens were left to dry for another 24 days at 23±2° C. and 50±5% relative humidity.

After drying, the specimens were subjected to aging before determining the liquid water transmission rate. To that end, three cycles are carried out consisting of the following:

24 hours in potable water at 23±2° C.

24 hours of drying at 50±2° C.

24 hours at 23±2° C. and 50±5% relative humidity

The average thickness of each dry film was calculated from the consumption and the content of non-volatile material of the product according to standard UNE-EN 1062-1. Each specimen was weighed and they were placed in a container filled with water at 23° C. and on a metal or plastic support with the surface coated downwardly, such that said face will be immersed 1 cm in the water. After 1 hour, 2 hours, 3 hours, 6 hours and 24 hours, the specimen was removed from the water and dried using to that end absorbent paper in order to be weighed.

With the obtained data, the increase of mass of the specimen divided by the surface in square meters, as a function of the square root of the time expressed in hours, was graphically represented. The slope of the linear part of the curve is the liquid water transmission rate, w, in kg/m²h$^{0.5}$.

| Liquid water permeability | | | | | | | |
|---|---|---|---|---|---|---|---|
| | SKL 445 | SKL 822 | DRY-FLEX | SIKA-FILL | UV-CRS | AC-PU | VAE | AC-PU/VAE |
| W (kg/m²h^(1/2)) | 0.0058 | 0.0082 | 0.0125 | 0.0245 | 0.0004 | 0.0174 | 0.0238 | 0.0128 |

3. Variation of the Color after Exposure to Solar Radiation

The test was conducted by means of colorimetry, measuring the values of L, a and b of the products once they are cured (7 days after their application) and establishing this data as the pattern. Measurement is taken again after 60 days of exposure a sunlight with the boards inclined)(45°) and oriented towards the south and located on the roof of the building. The variation with respect to the initial color is expressed by means of the term Delta E obtained from the following equation:

$$\Delta E^* = \sqrt{(\Delta L^*)^2 + (\Delta a^*)^2 + (\Delta b^*)^2}$$

| Variation of color after exposure to solar radiation outside | | | | | | | | |
|---|---|---|---|---|---|---|---|---|
| | SKL 445 | SKL 822 | DRY-FLEX | SIKA-FILL | UV-CRS | AC-PU | VAE | AC-PU/VAE |
| Delta E | 0.93 | 6.01 | 1.51 | 1.49 | 2.87 | 0.95 | 2.22 | 1.3 |

4. Variation of Mechanical Properties after Accelerated Aging

Elongation at break before and after accelerated aging.

Aging due to heat (70° C./160 days)

Another type of samples was prepared measuring 0.7 mm thick and are left to cure at 23° C. and 50%. Once cured, the elongation at break is tested by means of an extensometer, at a rate of 200 mm/min. For each product, part of the samples is introduced in an oven at 70° C. for 60 days, and after this time elongation at break is tested again. The variation occurring between the initial value and the value obtained after thermal aging is evaluated, expressing it in %.

| Variation of elongation at break after thermal aging | | | | | | | | |
|---|---|---|---|---|---|---|---|---|
| | SKL 445 | SKL 822 | DRY-FLEX | SIKA-FILL | UV-CRS | AC-PU | VAE | AC-PU/VAE |
| Initial elongation at break (%) | 201 | 470 | 214 | 527 | 558 | 428 | 746 | 388 |
| Final elongation at break (%) | 37 | 432 | 45 | 417 | 362 | 278 | 757 | 386 |
| Variation (%) | −81 | −8 | −79 | −21 | −35.1 | −35 | +1.5 | −0.5 |

As can be observed, the exemplary compositions show very satisfactory elongation results.

Aging in QUV (2000 h)

Part of the specimens prepared for the previous test are introduced in the QUV chamber for 2000 hours in which it is subjected to consecutive cycles consisting of 4 hours at 60° C. and UV radiation of 340 nm and 4 hours of condensation at 50° C. without UV radiation. Once the 2000 hours passed, the elongation at break is measured by means of an extensometer at a rate of 200 mm/min. This data is compared with the values obtained before aging and the variation between them is calculated, expressed in %.

| Variation of elongation at break after thermal aging | | | | | | | | |
|---|---|---|---|---|---|---|---|---|
| | SKL 445 | SKL 822 | DRY-FLEX | SIKA-FILL | UV-CRS | AC-PU | VAE | AC-PU/VAE |
| Initial elongation at break (%) | 201 | 470 | 214 | 527 | 558 | 428 | 746 | 388 |
| Final elongation at break (%) | 231 | 180 | Breaks before testing | 303 | 61.7 | 223 | 806 | 334 |
| Variation (%) | +15 | −62 | | −43 | −89 | −48 | +8 | −14 |

The exemplary compositions show satisfactory elongation results, for example, the initial results, though not so satisfactory after the 2000 hours of UV.

5. Adherence to Wet and Dry Concrete

The various products are applied as indicated in their technical data sheets on dry concrete (humidity <4%) and on previously moistened concrete (humidity 15-20%), are left to cure for 7 days and after this time the adherence is tested by means of direct traction equipment (Sattec). To that end, it is drilled with a diamond bit measuring 50 mm in diameter and to a depth equal to the applied product thickness plus 15-20 mm. The 50 mm steel adhesion test pieces are glued by means of epoxy adhesive consisting of two components on the part separated with the drill and after 24 hours the measurement is taken.

| Adherence to wet and dry concrete | | | | | | | | |
|---|---|---|---|---|---|---|---|---|
| Adhesion (MPa) | SKL 445 | SKL 822 | DRY-FLEX | SIKA-FILL | UV-CRS | AC-PU | VAE | AC-PU/VAE |
| Dry concrete | 2.75 | 8.80 | 2.32 | 2.16 | 1.92 | 2.07 | 1.53 | 1.92 |
| Wet concrete | 1.09 | 1.00 | 2.68 | 2.08 | 2.11 | 2.08 | 1.52 | 2.11 |

The results of the exemplary compositions in this test are consistent with the mean results of the various studied compositions.

As indicated above, the polyurethane and acrylic components have been supplied in exemplary embodiments as a single, previously combined, product due to the comfort and ease of obtaining it commercially. The inventors consider, for example, that the results can be substantially the same if both components are supplied to the exemplary compositions separately.

The acrylic-polyurethane-VAE (AC-PU/VAE) compositions of the disclosure showed good results in all the tests, and are close to those of polyurethane compositions, though with a considerably reduced cost.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. An aqueous composition suitable for coating roofs, facades, floors or vertical facings, comprising:
    i) at least one acrylic polymer,
    ii) at least one polyurethane polymer, and
    iii) at least one ethylene vinyl acetate emulsion in an amount of between 15 and 30% by weight of the total weight of the composition.

2. The composition according to claim 1, wherein the at least one acrylic polymer and the at least one polyurethane polymer is in the form of a combined product of at least one acrylic polymer with at least one polyurethane polymer.

3. The composition according to claim 2, wherein in the combined product of at least one acrylic polymer with at least one polyurethane polymer, the at least one polyurethane polymer is in a proportion between 5 and 85% by weight of the weight of the combined product.

4. The composition according to claim 2, wherein in the combined product of at least one acrylic polymer with at least one polyurethane polymer, the at least one polyurethane polymer is in a proportion between 10 and 50% by weight of the weight of the combined product.

5. The composition according to claim 2, wherein the combined product of at least one acrylic polymer with at least one polyurethane polymer is at a concentration between 30 and 40% by weight of the total weight of the composition.

6. The composition according to claim 2, wherein in the combined product of at least one acrylic polymer with at least one polyurethane polymer, the at least one polyurethane polymer is in a proportion between 10 and 30% by weight of the weight of the combined product.

7. The composition according to claim 2, wherein the combined product of at least one acrylic polymer with at least one polyurethane polymer is at a concentration of about 37% by weight of the total weight of the composition.

8. The composition according to claim 1, wherein the acrylic polymer is a thermoplastic, non-styrenic polymer in an external surfactant aqueous emulsion.

9. The composition according to claim 1, wherein the polyurethane polymer is an aliphatic polymer in aqueous solution or dispersion.

10. The composition according to claim 1, wherein the water content is between 10 and 40% by weight of the total weight of the composition.

11. A method for covering a roof, facade, floor or vertical facing with a composition, the method comprising:
    a) stirring the composition according to claim 1 by mechanical stirring until achieving complete homogeneity thereof; and
    b) applying the composition resulting from step a) on a roof, facade, floor or vertical facing with a roller, brush, trowel or by spraying.

12. The method according to claim 11, further comprising:
    c) applying the composition resulting from step a) on a dry layer obtained by step b) by means of a roller, brush, trowel or by spraying.

13. The method according to claim 11, further comprising incorporating a polyester mesh in the entirety of the coating surface or in individual points thereof.

14. The composition according to claim 1, wherein the ethylene vinyl acetate emulsion is in an amount of from 18 to 22% by weight of the total weight of the composition.

15. A method of applying a composition to a substrate, the method comprising:
    a) stirring the composition according to claim 1; and
    b) applying the composition resulting from the step a) on a substrate.

16. The method according to claim 15, wherein in step a), the stirring is conducted by mechanical stirring.

17. The method according to claim 15, wherein step a) is effective to achieve complete homogeneity of the stirred composition.

18. The method according to claim 15, wherein in step b), the composition is applied with a roller, brush, trowel or by spraying.

19. A roof, facade, floor or vertical facing, comprising an aqueous composition, wherein the aqueous composition comprises:
    i) at least one acrylic polymer,
    ii) at least one polyurethane polymer, and
    iii) at least one ethylene vinyl acetate emulsion in an amount of between 15and 30% by weight of the total weight of the composition.

* * * * *